United States Patent
Baehrle-Miller et al.

(10) Patent No.: US 11,046,297 B2
(45) Date of Patent: Jun. 29, 2021

(54) METHOD FOR CHECKING THE BRAKING FORCE IN A VEHICLE

(71) Applicant: Robert Bosch GmbH, Stuttgart (DE)

(72) Inventors: Frank Baehrle-Miller, Schoenaich (DE); Edith Mannherz, Weinsberg (DE)

(73) Assignee: Robert Bosch GmbH, Stuttgart (DE)

(*) Notice: Subject to any disclaimer, the term of this patent is extended or adjusted under 35 U.S.C. 154(b) by 39 days.

(21) Appl. No.: 16/300,671

(22) PCT Filed: Mar. 23, 2017

(86) PCT No.: PCT/EP2017/056942
§ 371 (c)(1),
(2) Date: Nov. 12, 2018

(87) PCT Pub. No.: WO2017/198372
PCT Pub. Date: Nov. 23, 2017

(65) Prior Publication Data
US 2019/0202426 A1    Jul. 4, 2019

(30) Foreign Application Priority Data
May 17, 2016    (DE) .................... 10 2016 208 396.1

(51) Int. Cl.
*B60T 17/22*    (2006.01)
*B60T 13/74*    (2006.01)
*B60T 13/58*    (2006.01)

(52) U.S. Cl.
CPC .......... *B60T 17/221* (2013.01); *B60T 13/588* (2013.01); *B60T 13/741* (2013.01)

(58) Field of Classification Search
CPC .... B60T 17/221; B60T 17/222; B60T 17/226; B60T 13/588; B60T 13/741
See application file for complete search history.

(56) References Cited

U.S. PATENT DOCUMENTS

| | | | | |
|---|---|---|---|---|
| 5,979,997 A | * | 11/1999 | Ohkubo | ................ B60T 8/3255 303/116.1 |
| 2002/0035832 A1 | * | 3/2002 | Nakamura | ............ B60T 8/4081 60/413 |

(Continued)

FOREIGN PATENT DOCUMENTS

| | | |
|---|---|---|
| CN | 103635367 A | 3/2014 |
| CN | 203496880 U | 3/2014 |

(Continued)

OTHER PUBLICATIONS

International Search Report corresponding to PCT Application No. PCT/EP2017/056942, dated Jun. 30, 2017 (German and English language document) (5 pages).

*Primary Examiner* — Bradley T King
*Assistant Examiner* — James K Hsaio
(74) *Attorney, Agent, or Firm* — Maginot, Moore & Beck LLP

(57) ABSTRACT

A method is used for checking the braking force in a vehicle, which has a hydraulic vehicle brake having a brake booster and an electromechanical brake device having a brake motor. In order to build up a braking force, first of all the brake booster is activated, and subsequently an electromechanical braking force is generated by application of the brake motor. If a pressure drop occurring in the brake fluid is outside a permissible value range, a fault signal is generated.

10 Claims, 5 Drawing Sheets

(56) References Cited

U.S. PATENT DOCUMENTS

| | | | |
|---|---|---|---|
| 2008/0106142 A1* | 5/2008 | Nishino | B60T 8/4081 303/10 |
| 2008/0234909 A1* | 9/2008 | Iwasaki | B60T 1/10 701/70 |
| 2010/0292889 A1* | 11/2010 | Cahill | B60T 8/1703 701/29.1 |
| 2013/0298550 A1* | 11/2013 | Leiber | B60T 13/686 60/545 |
| 2014/0345986 A1* | 11/2014 | Foitzik | B60T 7/12 188/106 P |
| 2015/0025737 A1* | 1/2015 | Hermsen | B60T 17/221 701/33.9 |
| 2015/0120162 A1* | 4/2015 | Yamada | B60T 17/221 701/70 |
| 2015/0127235 A1* | 5/2015 | Moessner | B60T 17/22 701/70 |
| 2015/0166034 A1* | 6/2015 | Schumann | B60T 13/52 701/70 |
| 2015/0175144 A1* | 6/2015 | Watanabe | B60T 8/92 303/10 |
| 2015/0217747 A1* | 8/2015 | Cahill | B60T 17/221 701/70 |
| 2015/0217749 A1* | 8/2015 | Leibfried | B60T 17/221 701/70 |
| 2015/0217750 A1* | 8/2015 | Sussek | B60T 17/221 701/70 |
| 2015/0292911 A1* | 10/2015 | Slanker | G01R 19/0092 324/207.16 |
| 2015/0353067 A1* | 12/2015 | Knechtges | B60T 8/4077 701/70 |
| 2015/0367828 A1* | 12/2015 | Oosawa | B60T 13/146 303/6.01 |
| 2016/0009257 A1* | 1/2016 | Joyce | B60T 17/221 701/70 |
| 2016/0016574 A1* | 1/2016 | Yang | B60T 8/885 702/34 |
| 2016/0016575 A1* | 1/2016 | Howell | B60T 13/662 701/3 |
| 2016/0016576 A1* | 1/2016 | Howell | B60T 8/1703 701/3 |
| 2016/0297413 A1* | 10/2016 | Alford | B60T 13/745 |
| 2016/0375887 A1* | 12/2016 | Baehrle-Miller | B60T 13/586 303/15 |
| 2017/0158184 A1* | 6/2017 | Choi | B60T 8/4081 |
| 2018/0222464 A1* | 8/2018 | Niepelt | B60T 13/66 |
| 2019/0299959 A1* | 10/2019 | Brennan | B60T 17/221 |

FOREIGN PATENT DOCUMENTS

| | | |
|---|---|---|
| CN | 104709264 A | 6/2015 |
| CN | 106256625 A | 12/2016 |
| DE | 103 49 970 A1 | 6/2005 |
| DE | 10 2004 004 992 A1 | 9/2005 |
| DE | 10 2009 047 127 A1 | 5/2011 |
| DE | 10 2011 006 457 A1 | 11/2011 |
| DE | 10 2010 063 404 A1 | 6/2012 |
| DE | 10 2012 213 289 A1 | 1/2014 |
| DE | 10 2014 222 197 A1 | 5/2016 |
| JP | 2013-537130 A | 9/2013 |

* cited by examiner

METHOD FOR CHECKING THE BRAKING FORCE IN A VEHICLE

This application is a 35 U.S.C. § 371 National Stage Application of PCT/EP2017/056942, filed on Mar. 23, 2017, which claims the benefit of priority to Serial No. DE 10 2016 208 396.1, filed on May 17, 2016 in Germany, the disclosures of which are incorporated herein by reference in their entireties.

The disclosure relates to a method for checking the braking force, in particular the parking-brake force, in a vehicle with a hydraulic vehicle brake and an electromechanical braking apparatus.

BACKGROUND

A parking-brake system with an electric brake motor for generating a parking-brake force immobilizing the vehicle at a standstill is described in DE 10 2004 004 992 A1. The electric brake motor of the parking-brake system has been integrated into the hydraulic wheel brake. For the purpose of generating the parking-brake force, the brake motor shifts a brake piston in the direction of a brake disk. In the course of a regular braking process, on the other hand, the brake piston is actuated by the hydraulic vehicle brake.

When the vehicle is being parked, the desired electromechanical parking-brake force is generated via the parking-brake system with the aid of the electric brake motor. If this force does not attain a demanded braking-force level, the hydraulic vehicle brake is additionally actuated.

SUMMARY

With the method according to the disclosure, a currently effective braking force in a vehicle can be checked that is made available both via a hydraulic vehicle brake and via an electromechanical braking apparatus with an electric brake motor. The hydraulic vehicle brake is a regular service brake which is employed in vehicle operation for the purpose of decelerating the vehicle. The electromechanical braking apparatus with an electric brake motor is preferably employed for generating a parking-brake force in order to generate a braking force immobilizing the vehicle at a standstill; but it is possible to decelerate the vehicle with the aid of the electromechanical braking apparatus in the course of traveling.

Both the hydraulic vehicle brake and the electromechanical braking apparatus act on the same brake piston of a wheel-brake device which is part of the hydraulic vehicle brake. The two braking systems can be employed alternatively or cumulatively; in the latter case, the total braking force that is generated results cumulatively by superposition of the hydraulic braking force generated by the hydraulic vehicle brake and the braking force generated electromechanically.

According to a preferred embodiment, the wheel-brake devices on the rear axle of the vehicle are each capable of being actuated both hydraulically and electromechanically, so an electric brake motor has also been integrated into each of these wheel-brake devices. On the other hand, the wheel-brake devices on the front axle of the vehicle have advantageously been equipped without an electric brake motor of an electromechanical braking apparatus and are situated only in a brake circuit of the hydraulic vehicle brake.

The hydraulic vehicle brake is equipped with a brake booster, in order to convert the brake-pedal force generated by the driver into an increased brake pressure of the brake fluid. The brake booster is constituted by a preferentially electrically controllable actuator, for instance an iBooster.

The method according to the disclosure relates to braking situations in which both the electromechanical braking apparatus, with the electric brake motor, and the hydraulic vehicle brake, with the brake booster, are active in order to generate a desired braking force.

With the aid of the method according to the disclosure, it can be established whether the hydraulic vehicle brake and the electromechanical braking apparatus are functioning properly. If this is not the case, a fault signal is generated which can be displayed to the driver or processed in some other way.

In the course of the method, firstly braking force is built up gradually, wherein, in a first step, firstly the brake booster of the hydraulic vehicle brake generates a defined set hydraulic brake pressure and subsequently, in a further step, the electric brake motor generates an electromechanical braking force by applying torque. By virtue of the torque-applying motion of the electric brake motor, the brake piston is shifted in the direction toward the brake disk, the shifting motion of the brake piston resulting in an increase in volume in the hydraulic brake circuit, which leads to a drop in pressure in the brake fluid. The drop in pressure can be ascertained, in which connection a fault signal obtains in the case where the drop in pressure lies outside a permissible range of values.

The loss of pressure arising in the hydraulic brake circuit by reason of the displacement of the brake piston follows a pressure/volume characteristic curve which is known for the hardware of the hydraulic vehicle brake being used in the given case. The displacement of the brake piston by the actuation of the electric brake motor of the electromechanical braking apparatus is likewise known; said displacement can, for instance, be ascertained from the progression of the current consumption of the brake motor, from which the free travel until the brake piston bears against the brake disk is also known. The additional volume for the hydraulic fluid results from the displacement of the brake piston and from the geometrical dimensions of the brake piston, and the concomitant drop in pressure results as set value from the pressure/volume characteristic curve of the brake fluid. If the actual measured drop in pressure lies outside the set value, a fault of the hydraulic vehicle brake and/or in the electromechanical braking apparatus has to be assumed.

For instance, it is possible to infer the type of fault from the extent of the drop in pressure. In the case where the drop in pressure is less than a predetermined threshold value, an insufficient electromechanical braking force—where appropriate, a pinched brake line—can, for example, be inferred. On the other hand, if the drop in pressure is greater than the threshold value, there is a fault in the hydraulic vehicle brake. This gives a differentiation criterion for distinguishing between a fault in the hydraulic vehicle brake and a fault in the electromechanical braking apparatus, in which connection further distinguishing criteria are drawn upon where appropriate for the purpose of more precise differentiation.

The drop in pressure can be evaluated both with regard to the absolute pressure difference and with regard to the progression of the drop in pressure, in order to obtain information about the type of fault. Given a correct mode of operation both of the hydraulic vehicle brake and of the electromechanical braking apparatus, the hydraulic brake pressure advantageously remains constant after the setting of a defined target value, the brake booster is not actuated further after the target value has been attained. While at the same time the electric brake motor overcomes the free travel, the hydraulic brake pressure remains constant, given orderly functioning. On the other hand, if a brake line in the hydraulic vehicle brake has been provided with a pinch which results in a throttle behavior in the brake line, the hydraulic brake pressure falls already prior to the build-up of electromechanical braking force, and persists at a lower level. This can be detected and can lead to a corresponding fault signal.

Given orderly functioning, the hydraulic brake pressure falls with the build-up of electromechanical braking force in accordance with a set-point curve. If the actual drop in pressure lags behind in comparison with the set-point curve, this indicates a pinched brake line through which brake fluid is no longer being transported.

In the case of a leakage in the hydraulic brake circuit, the pressure in the brake fluid falls continuously after the setting of the target pressure and without further actuation of the brake booster, which can likewise be detected and leads to a corresponding fault signal.

In the event of a fault in the electromechanical braking apparatus, the demanded build-up of braking force via the electric brake motor cannot be carried out, the target braking force of the electromechanical braking apparatus cannot be attained. Accordingly, the drop in pressure in the brake fluid is less than expected, which can likewise be detected and leads to a fault signal.

According to an advantageous embodiment, no readjustment of pressure takes place after the defined hydraulic brake pressure has been attained with the aid of the brake booster, so that, even given orderly functioning both of the hydraulic vehicle brake and of the electromechanical braking apparatus, a set drop in pressure is to be expected as soon as the brake piston is displaced by the electric brake motor.

According to a further expedient embodiment, the electric brake motor is actuated already during the build-up of the hydraulic brake pressure, in order to cover the free travel until a brake contact-point is reached at which the brake piston shifted by the brake motor bears against the brake disk without clearance. By this means, it is guaranteed that the entire braking process is carried out in a short time with the build-up of hydraulic and electromechanical braking force.

According to a further expedient embodiment, the set hydraulic brake pressure that is generated by the actuation of the brake booster is higher than the brake pressure that is required for attaining the target braking force. This takes account of the fact that with the displacing of the brake piston by the electric brake motor a drop in pressure occurs in the brake fluid. Prior to the build-up of the electromechanical braking force, the hydraulic brake pressure remains constant, given orderly functioning of the hydraulic vehicle brake.

The brake booster constitutes an actuator which is capable of being actuated electrically. It is a question, for instance, of an electric motor which actuates (iBooster) a master brake cylinder in the hydraulic vehicle brake via a transmission. But electrically triggerable hydraulic pumps also enter into consideration, for example the hydraulic pump of an electric stability program (ESP) which, where appropriate, has been additionally integrated into the hydraulic vehicle brake.

The steps of the method proceed in a closed-loop or open-loop control unit in which regulating signals for triggering the various components of the braking system with the hydraulic vehicle brake, inclusive of brake booster, and with the electromechanical braking apparatus, with the electric brake motor, are generated. The braking system comprises both the hydraulic vehicle brake and the electromechanical braking apparatus.

BRIEF DESCRIPTION OF THE DRAWINGS

Further advantages and expedient embodiments can be gathered from the description of the figures, and from the drawings. Shown are.

DETAILED DESCRIPTION

In the figures, identical components have been provided with identical reference symbols.

Figure 1:
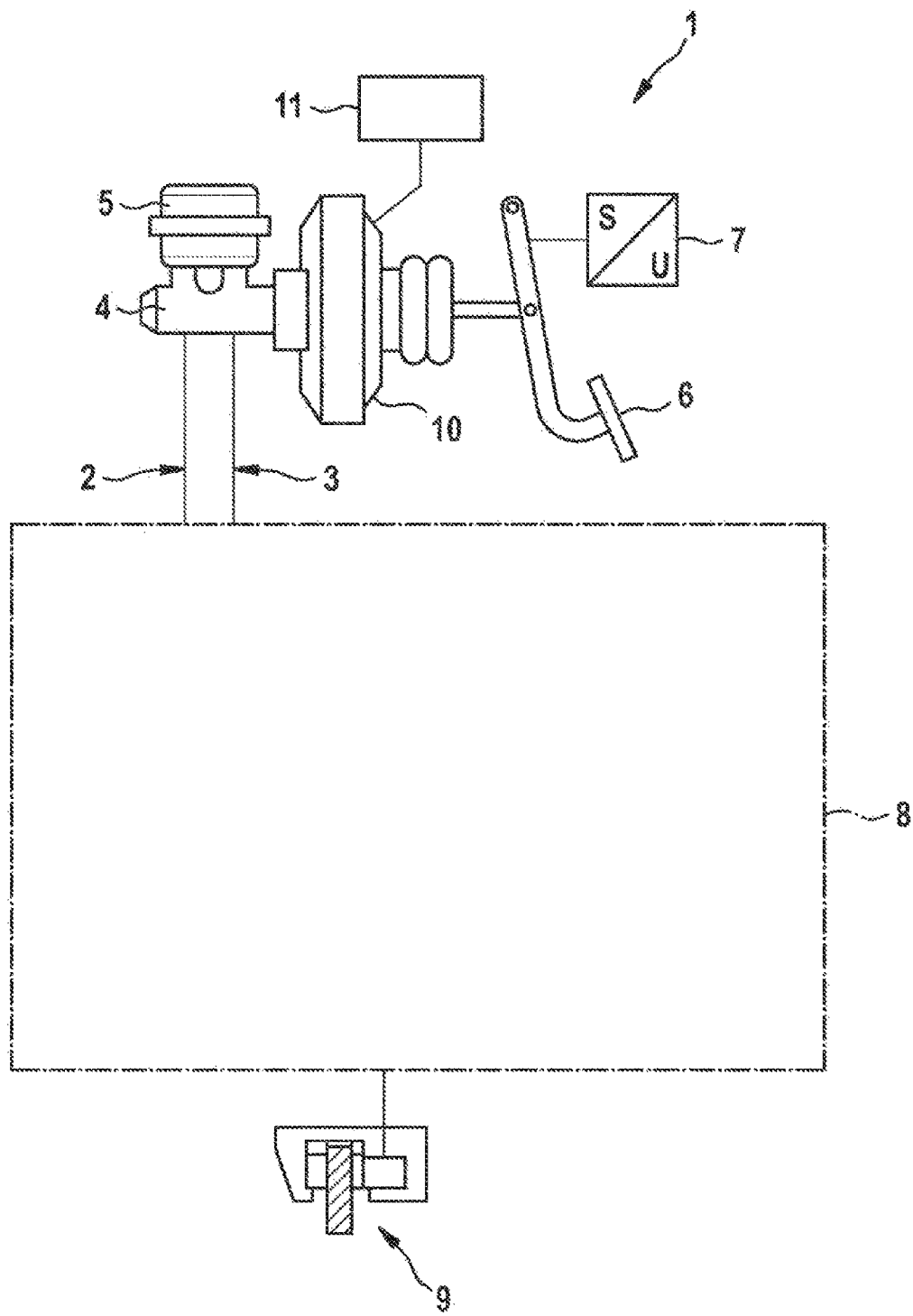
FIG. 1 a schematic representation of a with a hydraulic vehicle brake with a brake booster constituting an actuator, wherein the wheel-brake devices of the vehicle brake on the rear axle of the vehicle have additionally been realized as an electromechanical braking apparatus with an electric brake motor, FIG. 2 a section through an electromechanical braking apparatus with an electric brake motor, FIG. 3 a graph showing the progression of the brake pressure (solid), of the motor current of the brake motor (dashed), and of the total braking force (dash-dotted), plotted in each instance for an orderly braking process, FIG. 4 a graph corresponding to FIG. 3, plotted for a braking process with a blocked hydraulic brake line, FIG. 5 a further graph, plotted for a braking process with a hydraulic brake line with reduced cross-section, FIG. 6 a further graph, plotted for a braking process with a leakage in the hydraulic vehicle brake, FIG. 7 a further graph, plotted for a braking process with a defect in the electromechanical braking apparatus.

The hydraulic vehicle brake 1, represented in FIG. 1, for a vehicle includes a front-axle brake circuit 2 and a rear-axle brake circuit 3 for supplying and triggering wheel-brake devices 9 on each wheel of the vehicle with a brake fluid under hydraulic pressure. The two brake circuits 2, 3 are linked to a common master brake cylinder 4 which is supplied with brake fluid via a brake-fluid reservoir 5. The piston of the master brake cylinder within the master brake cylinder 4 is actuated by the driver via the brake pedal 6; the pedal travel executed by the driver is measured via a pedal-travel sensor 7. Located between the brake pedal 6 and the master brake cylinder 4 is a brake booster 10 which, for instance, includes an electric motor which preferably actuates (iBooster) the master brake cylinder 4 via a transmission. The brake booster 10 constitutes an electrically controllable actuator for influencing the brake pressure.

The regulating motion of the brake pedal 6 measured by the pedal-travel sensor 7 is communicated as a sensor signal to a closed-loop or open-loop control unit 11 in which regulating signals for triggering the brake booster 10 are generated. The supply of the wheel-brake devices 9 with brake fluid takes place in each brake circuit 2, 3 via various switching valves which, together with further assemblies, are part of brake hydraulics 8. A hydraulic pump which is an integral part of an electronic stability program (ESP) pertains furthermore to the brake hydraulics 8.

Figure 2:
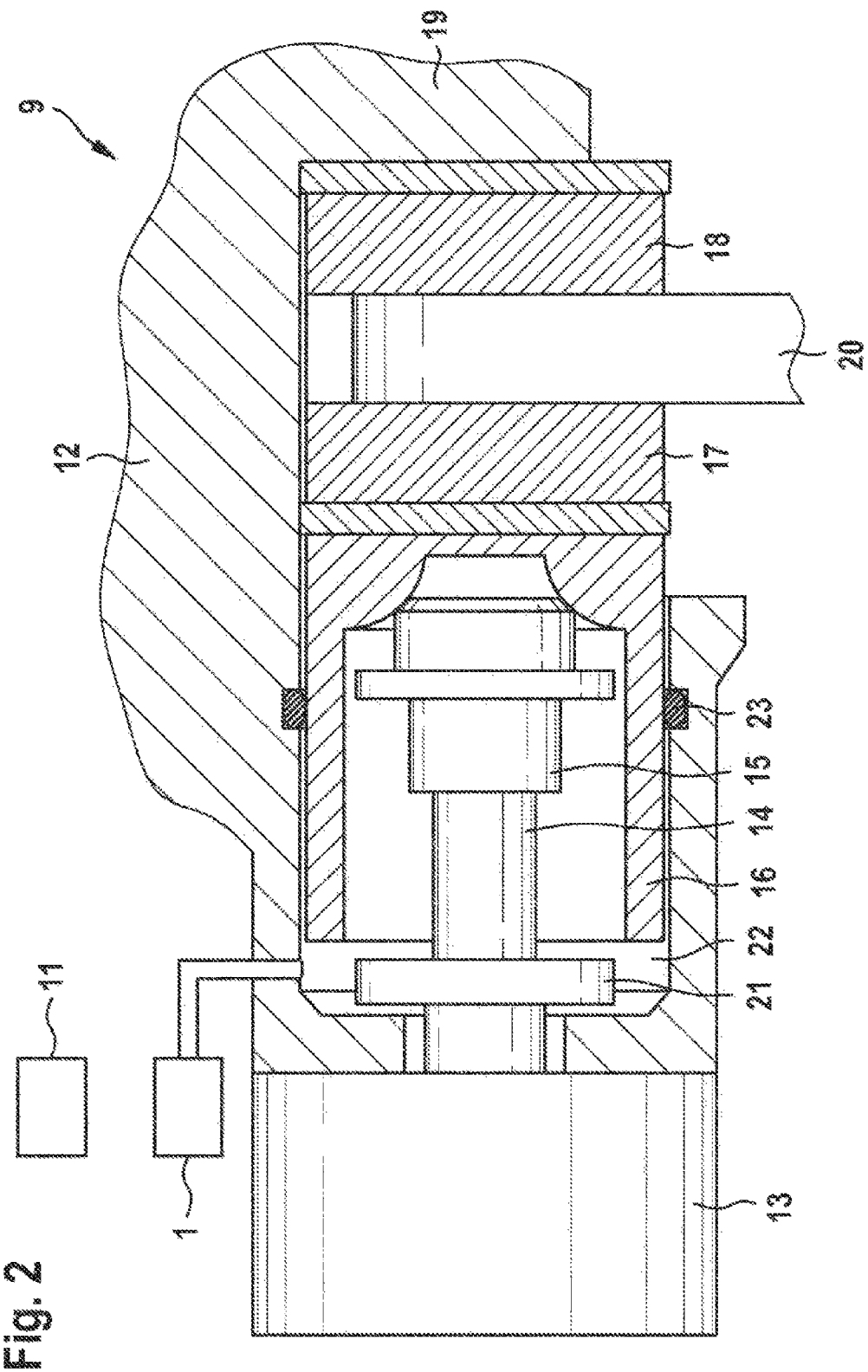

In FIG. 2, the wheel-brake device 9, which is arranged on a wheel on the rear axle of the vehicle, is represented in detail. The wheel-brake device 9 is part of the hydraulic vehicle brake 1 and is supplied with brake fluid 22 from the rear-axle brake circuit. The wheel-brake device 9 exhibits, in addition, an electromechanical braking apparatus which is preferably employed for immobilizing a vehicle at a standstill but may also be employed in the course of a movement of the vehicle for the purpose of decelerating the vehicle, in particular at relatively low vehicle speeds below a speed limit.

The electromechanical braking apparatus includes a brake caliper 12 with a pincer 19 which overlaps a brake disk 20. By way of regulating element, the braking apparatus exhibits a DC electric motor as brake motor 13, the rotor shaft of which drives in rotation a spindle 14 on which a spindle nut 15 is rotatably mounted. In the course of a rotation of the spindle 14, the spindle nut 15 is shifted axially. The spindle nut 15 moves within a brake piston 16 which is carrier of a brake pad 17 which is pressed against the brake disk 20 by the brake piston 16.

Located on the opposite side of the brake disk 20 is a further brake pad 18 which is held stationary against the pincer 19. On its outside the brake piston 16 is sealed in flow-tight manner in relation to the receiving housing via an encompassing sealing ring 23.

Within the brake piston 16 the spindle nut 15 is able to move, in the course of a rotational motion of the spindle 14, axially forward in the direction toward the brake disk 20 or, in the course of a contrary rotational motion of the spindle 14, axially rearward until reaching a stop 21. For the purpose of generating a clamping force, the spindle nut 15 acts on the inner front side of the brake piston 16, as a result of which the brake piston 16 which is mounted in the braking apparatus so as to be axially displaceable is pressed with the brake pad 17 against the facing front face of the brake disk 20.

For the hydraulic braking force, the hydraulic pressure of the brake fluid 22 from the hydraulic vehicle brake 1 acts on the brake piston 16. The hydraulic pressure can also be effective in assisting manner at a standstill of the vehicle upon actuation of the electromechanical braking apparatus, so that the total braking force is composed of the portion provided by the electric motor and of the hydraulic portion. During the running of the vehicle, either only the hydraulic vehicle brake is active or both the hydraulic vehicle brake and the electromechanical braking apparatus are active or only the electromechanical braking apparatus is active in order to generate braking force. The regulating signals for triggering both the adjustable components of the hydraulic vehicle brake 1 and the electromechanical wheel-brake device 9 are generated in the closed-loop or open-loop control unit 11.

In each of FIGS. 3 to 7 a graph is shown with the progression of the hydraulic brake pressure p, represented by a solid line, of the motor current I, represented by a dashed line, of the brake motor, and of the total braking force $F_{br}$, represented by a dash-dotted line. Between two times t4 and t5 the electromotive braking force $F_e$ runs congruently with the motor current I.

Figure 3:
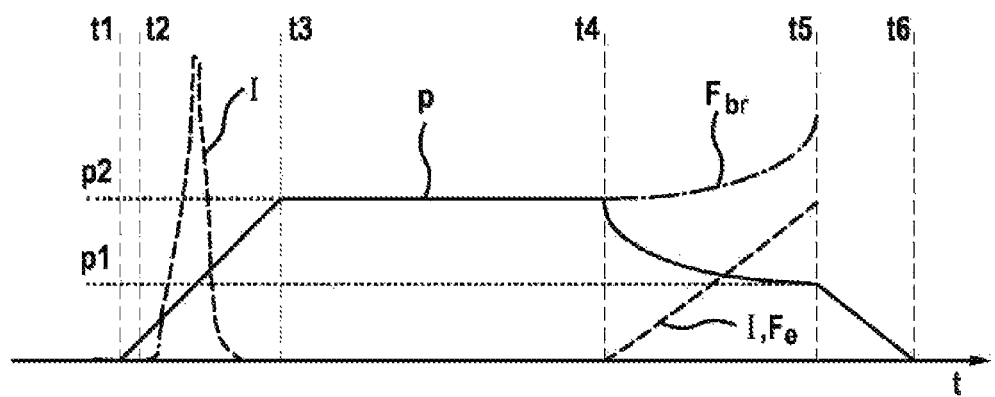

FIG. 3 shows the graph for an orderly braking process with functioning hydraulic vehicle brake and functioning electromechanical braking apparatus. On the other hand, in FIGS. 4 to 6 the hydraulic vehicle brake is defective; in FIG. 7 the electromechanical braking apparatus is defective.

On the basis of the properly functioning progression in FIG. 3, the mode of operation for a braking process at a standstill of the vehicle for the purpose of generating a clamping force immobilizing the vehicle will be elucidated. Firstly, in a first step, the brake booster in the hydraulic vehicle brake is triggered, and a defined hydraulic brake pressure p2 is set in the hydraulic vehicle brake. The beginning of the rise in the hydraulic brake pressure p occurs at time t1. At time t3 the target brake pressure has been attained, which is retained in the further progression up until time t4; in the time-interval between t3 and t4 the brake booster is not actuated further, so the brake pressure p remains constant. The rise occurs linearly between times t2 and t3, in which connection a progression deviating therefrom, for instance an S-shaped progression of the rise, may occur where appropriate.

At time t2, which follows shortly after the start-time t1, the electric brake motor of the electromechanical braking apparatus is actuated, and torque is applied in the direction of the build-up of a braking force. The triggering of the electric brake motor is characterized by a brief peak value in the motor current I, which in the further progression in the period between times t3 and t4 drops to a low value slightly above the zero line, which is characterized by the idling of the electromechanical braking apparatus. At time t4 the clearance between the brake pad on the brake piston, which is shifted by the electric brake motor, and the brake disk is overcome, whereupon in the time-interval between t4 and t5 an electromechanical braking force $F_e$ is built up which runs parallel to or congruently with the motor current I.

With the build-up of electromechanical braking force $F_e$ the piston is displaced by the brake motor, as a result of which the volume available for the brake fluid increases, and the brake pressure p drops from the target brake pressure p2 to a reduced brake pressure p1 which is approximately one half of the target brake pressure p2. The total braking force $F_{br}$, which is composed of the electromechanical component $F_e$ and the hydraulic braking-force component, rises progressively up until time t5, at which the linearly rising electromechanical braking force $F_e$ has reached its maximum and the hydraulic brake pressure p drops to zero in ramp-like manner.

Figure 4:
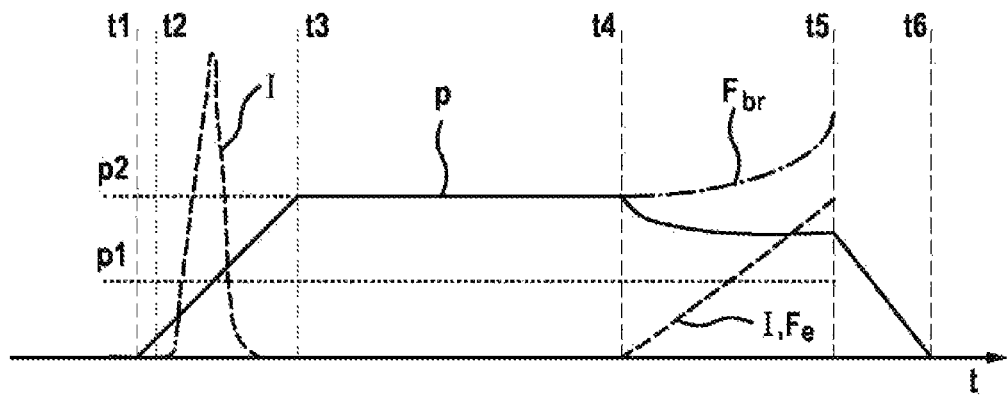

FIG. 4 shows a case of a fault in the braking system, in which a hydraulic brake line of the hydraulic vehicle brake is blocked, for instance by being pinched, so that no brake fluid is able to flow through this brake line. Although the target pressure p2 is attained upon actuation of the brake booster, the drop in pressure between times t4 and t5 is less than the set drop in pressure according to FIG. 3. The drop in pressure corresponds to approximately one half of the set drop in pressure, and this can be sensed via pressure sensors, whereupon a corresponding fault signal can be generated. From the extent of the actual drop in pressure, the type of fault, namely a pinched brake line in the hydraulic vehicle brake, can be inferred.

Figure 5:
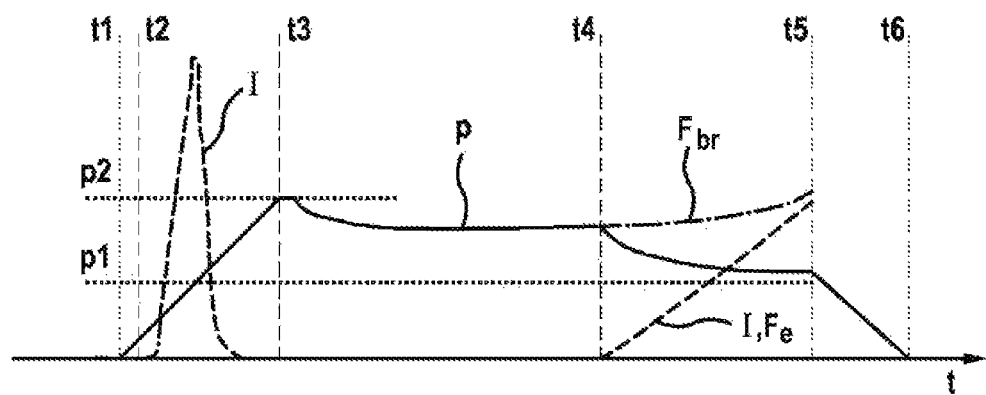

FIG. 5 represents the case of a fault of a hydraulic brake line with reduced cross-section, which may happen, for instance, as a result of pinching of the brake line. The reduced cross-section of the brake line leads to a throttling behavior, this being expressed, between times t3 and t4, in a drop in pressure in comparison with the set pressure p2. After attaining the set pressure p2 at time t3, the hydraulic brake pressure drops to a lower brake-pressure level which is retained up until time t4, at which electromechanical braking force is generated.

The drop in pressure in the time-interval between t4 and t5 is greater than in the case of a blocked brake-pressure line (FIG. 4) but less than the set drop in pressure (FIG. 3). From the extent of the drop in pressure at time t5, the type of fault can likewise be inferred.

Figure 6:
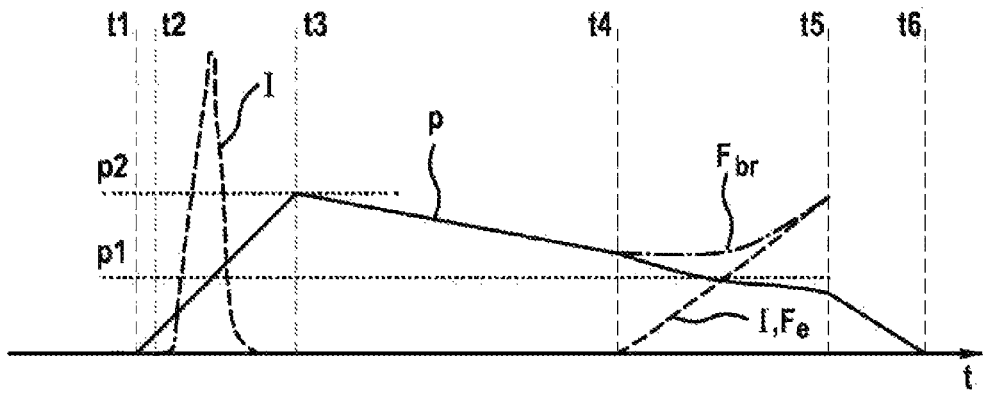

FIG. 6 shows the graph with a premature drop in pressure by reason of a leakage in the hydraulic vehicle brake. With the attaining of the set pressure p2 at time t3, the hydraulic brake pressure p already drops continuously during the idling phase between t3 and t4. With the build-up of electromechanical braking force between times t4 and t5, the brake-pressure level p diminishes further and drops below pressure level p1 which in the case of an intact braking system (FIG. 3) is attained at time t5. Also from this drop in pressure, the type of fault can be inferred.

Figure 7:
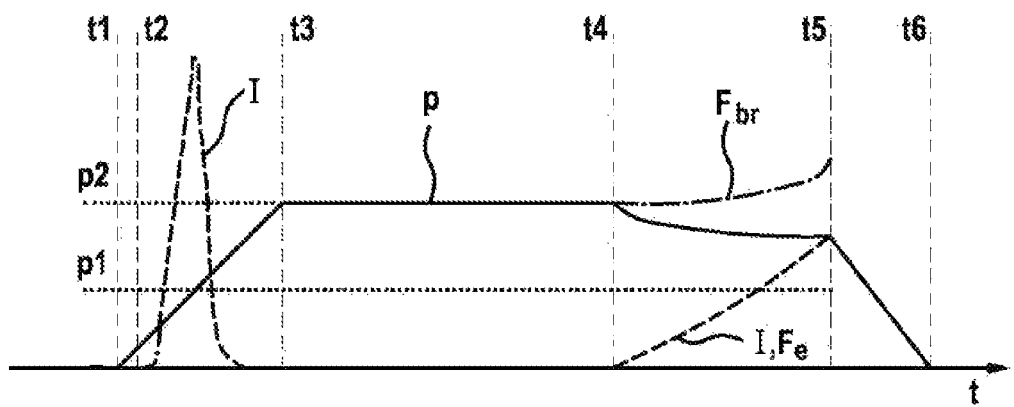

In FIG. 7 the braking situation with properly functioning hydraulic vehicle brake but with a fault in the electromechanical braking apparatus is represented. By reason of this fault, the brake piston is displaced less far than in the case of orderly functioning, so that a smaller additional volume for the brake fluid arises and correspondingly the drop in pressure in the progression of the brake pressure p turns out to be less than in the case of orderly functioning according to FIG. 3. The drop in pressure is also less than in the case of a blocked hydraulic brake line according to FIG. 4, so the type of fault can likewise be inferred.

The invention claimed is:

1. A method for checking the braking force in a vehicle with a hydraulic vehicle brake, in which hydraulic braking force generated with a brake booster, and an electromechanical braking force generated by an electromechanical braking apparatus, act on a wheel-brake piston of a wheel-brake device, the method comprising:
   building up a braking force, including
      firstly, the brake booster setting a hydraulic brake fluid pressure in the wheel-brake device, and
      subsequently, generating an electromechanical braking force by applying torque of the electric brake motor to the wheel-brake piston thereby reducing the hydraulic brake fluid pressure in the wheel-brake device; and
   generating a fault signal when the reduction in the hydraulic brake fluid pressure lies outside a permissible range of values.

2. The method as claimed in claim 1, wherein:
   as the brake booster is setting the hydraulic brake fluid pressure, and before the brake fluid pressure is set, the electric brake motor is actuated until a brake contact-point is reached whereat the wheel-brake piston bears against a brake disk without clearance.

3. The method as claimed in claim 1, wherein after the brake booster firstly sets the hydraulic brake fluid pressure, the brake booster is not actuated further.

4. The method as claimed in claim 1, wherein the hydraulic brake fluid pressure that is firstly set by the brake booster is higher than a brake fluid pressure required for attaining a target braking force.

5. The method as claimed in claim 1, further comprising: inferring a type of fault from the reduction in the hydraulic brake fluid pressure.

6. The method as claimed in claim 5, wherein:
   when the reduction in the hydraulic brake fluid pressure lies below a threshold value when the fault signal is generated, an insufficient electromechanical braking force is inferred; and
   when the reduction in the hydraulic brake fluid pressure is not below the threshold value when the fault signal is generated a fault in the hydraulic vehicle brake is inferred.

7. The method as claimed in claim 1, wherein the method is implemented in wheel-brake devices on a rear axle of the vehicle.

8. The method as claimed in claim 1, wherein the method is implemented in a course of generating a parking-brake force.

9. The method of claim 1, further comprising:
   implementing the method with a closed-loop or open-loop control unit.

10. A braking system in a vehicle, comprising:
    a hydraulic vehicle brake;
    an electromechanical braking apparatus with an electric brake motor; and
    a closed-loop or open-loop control unit configured to trigger adjustable components of the braking system, control building up a braking force by
       firstly controlling the brake booster to set a hydraulic brake fluid pressure in the hydraulic vehicle brake, and
       subsequently controlling the electric brake motor to generate electromechanical braking force by applying torque of the electric brake motor to a wheel-brake piston thereby reducing the hydraulic brake fluid pressure; and
    generate a fault signal if the reduction in the hydraulic brake fluid pressure lies outside a permissible range of values.

* * * * *